M. H. CLARK.
VULCANIZING APPARATUS.
APPLICATION FILED JUNE 4, 1915.
1,215,910.
Patented Feb. 13, 1917.
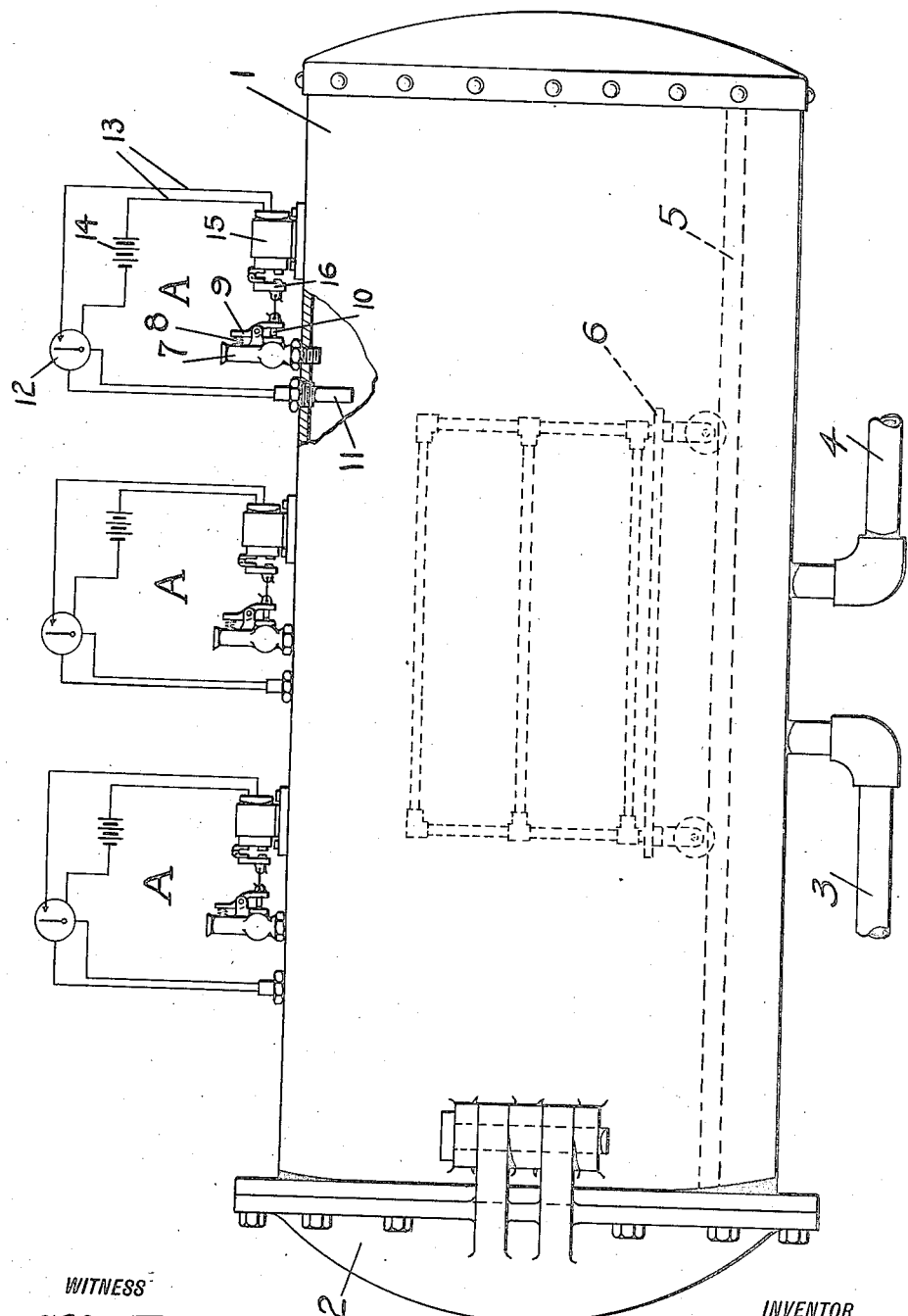
WITNESS
S. L. Taylor.
INVENTOR
Myron H. Clark,
BY
Ernest Hopkinson
HIS ATTORNEY

UNITED STATES PATENT OFFICE.

MYRON H. CLARK, OF HASTINGS-UPON-HUDSON, NEW YORK, ASSIGNOR TO BOSTON RUBBER SHOE COMPANY, A CORPORATION OF MASSACHUSETTS.

VULCANIZING APPARATUS.

1,215,910.   Specification of Letters Patent.   Patented Feb. 13, 1917.

Application filed June 4, 1915. Serial No. 32,049.

*To all whom it may concern:*

Be it known that I, MYRON H. CLARK, a citizen of the United States, residing at Hastings-upon-Hudson, county of Westchester, State of New York, have invented certain new and useful Improvements in Vulcanizing Apparatus, of which the following is a full, clear, and exact description.

This invention relates to vulcanizing apparatus, and has for an object to provide means for automatically maintaining uniform conditions of temperature throughout the chamber thereof, whereby unequal curing of the articles being treated is obviated.

This invention relates particularly to vulcanizers in which the vulcanizing medium is maintained at a pressure greater than atmospheric, as distinguished from the so-called "open-heat" vulcanizing chambers.

In the apparatus used for pressure curing, the vulcanizing medium, usually superheated steam, carbon dioxid or air, is introduced into the chamber by a suitable conduit, in case carbon dioxid or air is used, the proper pressure being provided by a suitable pressure pump. It has been found, however, that it is practically impossible to obtain an even distribution of the vulcanizing medium or to remove all the air in the chamber prior to the introduction of the vulcanizing medium, and that the air remaining in the chamber tends to collect in pockets at a lower temperature than that of the surrounding medium. These pockets cause an uneven curing of the articles in the chamber, and result in the production of a large proportion of inferior goods. This effect is most noticeable in a vulcanizer which is but partially charged.

The usual method of introducing articles to be cured into the vulcanizing chamber is by means of racks or cars which run on tracks leading into the chamber. Each chamber is made sufficiently large to receive a plurality of these cars or racks, and it frequently occurs that the chamber is only partially filled, sometimes being closed and the heated medium introduced with but a single car inside.

It is, of course, obvious that the more goods introduced the less the amount of air remaining to be displaced by the vulcanizing medium, and it naturally follows that, in case the chamber is but partially charged, the probability of complete removal of the cold atmosphere within it is very small. On the other hand, when the chamber is filled to capacity, the interior is so divided by the cars and the goods thereon, that few spaces remain which are large enough to contain air pockets of a size which will have any noticeable effect on the goods undergoing treatment, while in a partly filled chamber, experience has shown that air pockets do form and seriously interfere with the satisfactory vulcanization of the goods. It is to overcome the condition I have just described that my invention is intended.

By my invention I provide means whereby such air pockets as are described above are automatically removed and a circulation of the medium is set up in the chamber, all of which is more fully set forth in the following specification and illustrated in the accompanying drawing, in which the figure is a side elevation, partly in section, of a vulcanizer built according to my invention.

In the drawing 1 is a vulcanizing chamber of ordinary construction, having at one end a door 2 capable of receiving an airtight closure. A conduit 3 is connected with the source of the vulcanizing medium, and a similar conduit 4 is provided for an exit for emptying the chamber. In case the articles to be treated are boots or shoes, the chamber 1 is also ordinarily provided with a suitable track 5 for receiving one or more cars 6 which carry the lasted footwear.

Thus far I have described the conventional vulcanizing chamber. The portion which constitutes my invention consists of a plurality of blow-off mechanisms A, the exact number depending on the size of the chamber 1, the medium used, and various other conditions. At the desired points about the wall of the chamber 1 are provided valves 7 communicating with the interior, said valves being normally kept closed by any suitable means, as in the type I have illustrated, a spring 8 acting through a lever 9 to hold a needle 10 in yieldingly closed position.

Inside the chamber and near each of the valve ports is placed a bulb 11 capable of communicating the variations in temperature at those points to an indicator 12 located outside the chamber. The type I have illustrated comprises an electro-thermal couple, but any heat-measuring instrument which operates an indicator remote from the bulb, is equally suitable for my purpose.

Wiring 13 connects the indicator 12 and a battery 14 with an electro-magnet 15, the armature 16 of which is connected with the needle 10 of the valve 7, and which when energized operates to open the same by withdrawing said needle.

The operation of my device is as follows: When the heated medium is introduced into the chamber 1, any portion of the cooler air therein which is not forced out through the pipe 4, localizes in one or more places in the chamber forming so-called "pockets," thereby preventing even diffusion of the hot medium.

The blow-off valves 7 are so positioned about the wall of the chamber that in case such a pocket forms in any part, at least one of the bulbs will be affected by the correspondingly colder temperature and the needle of the indicator 12 will be deflected. Such a deflection completes the circuit through the wires 13, the battery 14, and the electro-magnet 15, whereby the latter is energized and the pin 10 is withdrawn, opening the valve 7. The medium in the chamber, being under pressure, forces the air forming the pocket out through the thus-opened valve, whereby a circulation is set up until the space which was occupied by the cooler gas or air is filled with the hotter medium. The succeeding rise in temperature at that point, of course, heats the bulb 11 whereby the needle of the indicator 12 resumes its normal position, breaking the circuit through the wires 13 and causing the release of the valve pin 10 by the magnet 15, the spring 7 closing the valve.

By the use of this device, unequal temperatures caused by more rapid radiation of heat at certain points where the vulcanizing medium is more or less stagnant, are obviated, and pockets of air or of the medium itself occurring in parts of the chamber are quickly removed without substantial loss of the vulcanizing medium, and necessity for a positively produced circulation through the chamber, utilized in many types of apparatus for maintaining an even heat, is dispensed with. It is obvious that the medium which escapes from the valves may be collected in a suitable reservoir and reused.

While I have shown blow-off valves only along the top of the chamber, I do not wish to be understood as limiting myself to that arrangement as the location and number of valves depend in great part on the nature of the vulcanizing medium used, the positions I have indicated serving only to illustrate some among many points where the blow-off valves may be located.

I also contemplate providing the apparatus to be used for some classes of work, with a device to rotate a cam on the indicator 12, so that the electrical contact therein will not be created at a constant temperature at all times during the cure, but will be made at varying temperatures for the different periods thereof, as may be predetermined.

What I claim and desire to protect by Letters Patent is:

1. In combination with a vulcanizer containing a heated medium, means within said vulcanizer for automatically producing circulation in said medium and controlled by the temperature of the same.

2. In combination with a vulcanizer containing a heated medium, a plurality of means within said vulcanizer for automatically producing circulation in said medium and controlled by the temperature of the same.

3. In combination with a vulcanizer containing a heated vulcanizing medium, means for producing circulation therein by automatically permitting the escape of that portion of the medium, the temperature of which is below normal.

4. In combination with a vulcanizer containing a heated vulcanizing medium, a plurality of means for producing circulation therein by automatically permitting the escape of that portion of the medium, the temperature of which is below normal.

5. In combination with receptacles containing a heated medium, a plurality of thermo-statically controlled means for automatically providing localized circulation at points where the temperature is below normal.

6. In combination with receptacles containing a heated medium, an escape valve, and means for thermo-statically actuating said valve when the temperature of said medium within said receptacles is below normal.

7. In combination with a vulcanizer containing a heat vulcanizing medium, an escape-valve communicating with the interior of the vulcanizer for automatically providing localized circulation at points where the temperature varies from the normal, electrical means for controlling said valve and a heat sensitive member for operating said electrical means, operatively responsive to temperature variations from the normal within the vulcanizer.

Signed at New York, N. Y., this 1st day of June, 1915.

MYRON H. CLARK.